United States Patent [19]
Scott

[11] Patent Number: 5,072,901
[45] Date of Patent: Dec. 17, 1991

[54] PIPE SUPPORT STAND

[76] Inventor: Lyle Scott, P.O. Box 782, Morinville, Alberta, Canada, T0G 1P0

[21] Appl. No.: 540,705

[22] Filed: Jun. 20, 1990

[51] Int. Cl.⁵ ............................................. F16L 3/00
[52] U.S. Cl. .................................................. 248/49
[58] Field of Search ...................... 248/49, 80, 676, 65

[56] References Cited

U.S. PATENT DOCUMENTS

| | | | |
|---|---|---|---|
| 2,550,001 | 4/1951 | Button | 248/49 |
| 4,433,825 | 2/1984 | Dernedde et al. | 248/676 X |
| 4,513,934 | 4/1985 | Pruyne | 248/65 X |
| 4,899,963 | 2/1990 | Murphy | 248/65 |

FOREIGN PATENT DOCUMENTS

| | | | |
|---|---|---|---|
| 418023 | 8/1925 | Fed. Rep. of Germany | 248/676 |
| 443503 | 3/1936 | United Kingdom | 248/65 |

*Primary Examiner*—David L. Talbott
*Attorney, Agent, or Firm*—Dressler, Goldsmith, Shore, Sutker & Milnamow, Ltd.

[57] ABSTRACT

A pipe support stand is provided which is a plastic modular unit of a generally pyramidal shape. The unit has a hollow interior to permit stackability. Four angled legs are defined at each of its corners. A central substantially vertical rib increases the mechanical strength and stability of the unit.

2 Claims, 2 Drawing Sheets

PIPE SUPPORT STAND

FIELD OF THE INVENTION

The present invention relates to a support stand for pipeline construction projects.

BACKGROUND OF THE INVENTION

During the construction and installation of a pipeline, it is necessary to support the interconnected pieces of pipe prior to its insertion into the ground. Up to the present time, a typical pipe support stand comprised a wooden four-legged horse having a strap across the top. The strap defined a groove which was adapted to receive the pipe. The disadvantages of these prior art units resided in their heaviness, propensity to breakage and the limited stackability of the units.

There existed, therefore, the need for a pipe support stand exhibiting the following characteristics.
  lightness in weight;
  ability to stack more than 3 or 4 units together such as was the case with the above-described prior art units;
  unbreakability; and
  stability when in use thus avoiding the possibility of damage to the pipe coating, which would occur when the stand toppled over.

SUMMARY OF THE INVENTION

In accordance with the present invention, there is provided a modular pipe support stand formed of a substantially unbreakable suitable plastic. Preferably, the plastic would comprise polyethylene. A further advantage of using such a material resides in the fact that the stand is of a light weight (in the order of about seven pounds). A hollow interior is provided which means that as many as fourteen or more units may be stacked together at one time. A central rib provides increased mechanical strength and stability to the stand. Preferably, two substantially vertical ribs may be provided at the centre of the stand, thus improving the strength and stability thereof. A continuous base defining an outwardly projecting lip still further increases the stability of the stand.

In a broad aspect, the invention relates to a stand for supporting an elongate tubular member which comprises:
  a generally pyramidially shaped modular body formed of plastic, said body further forming a hollow interior, said body further defining an upper generally arcuate recess on its upper surface adapted to receive the tubular member therein, and forming four angled legs at the outer corners thereof and a central rib on each side thereof and said body further having a substantially continuous base forming an outwardly extending lip.

DESCRIPTION OF THE PREFERRED EMBODIMENT

Figure 1:
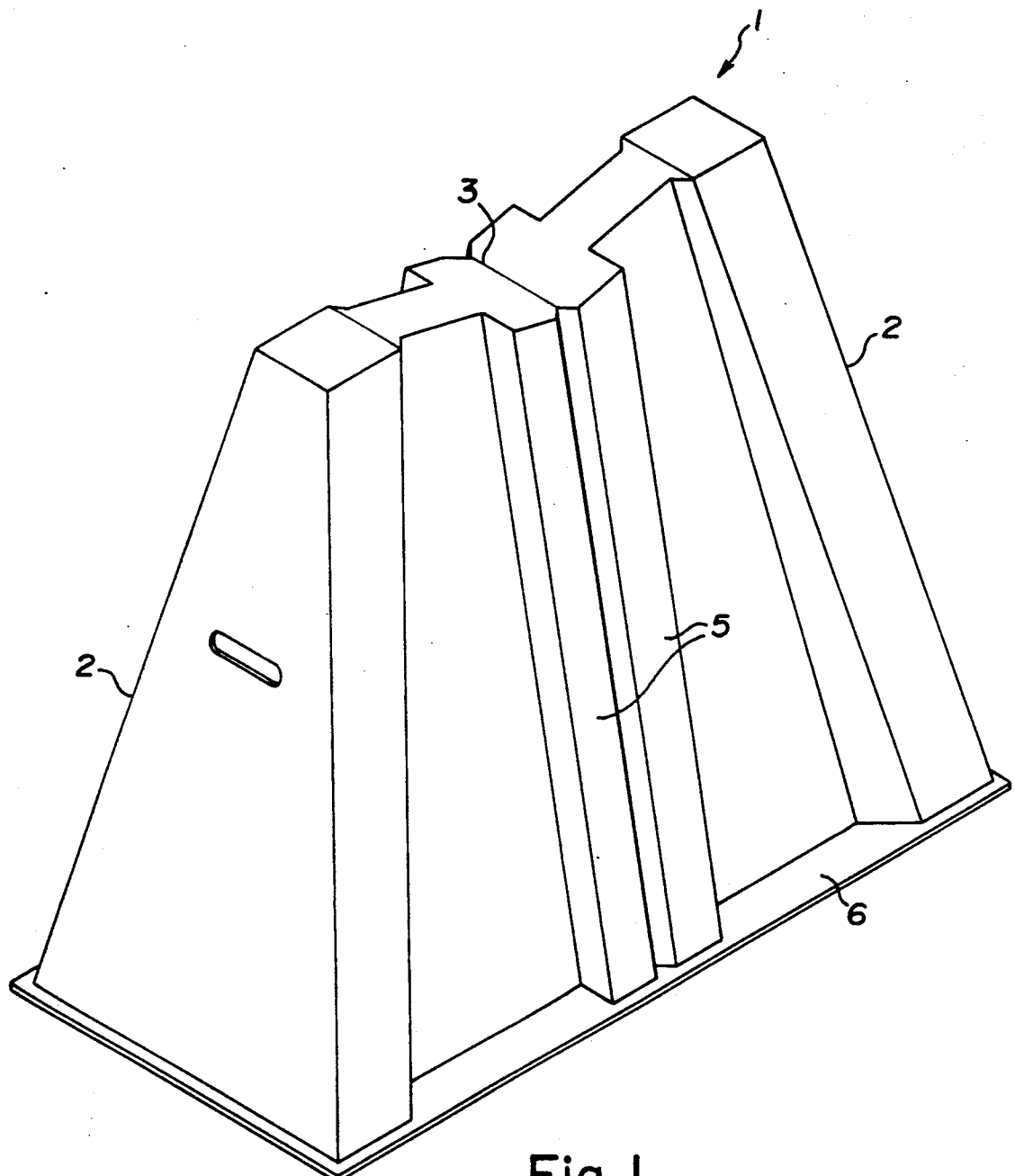
FIG. 1 is a perspective view of the preferred embodiment of the stand.
Figure 2:
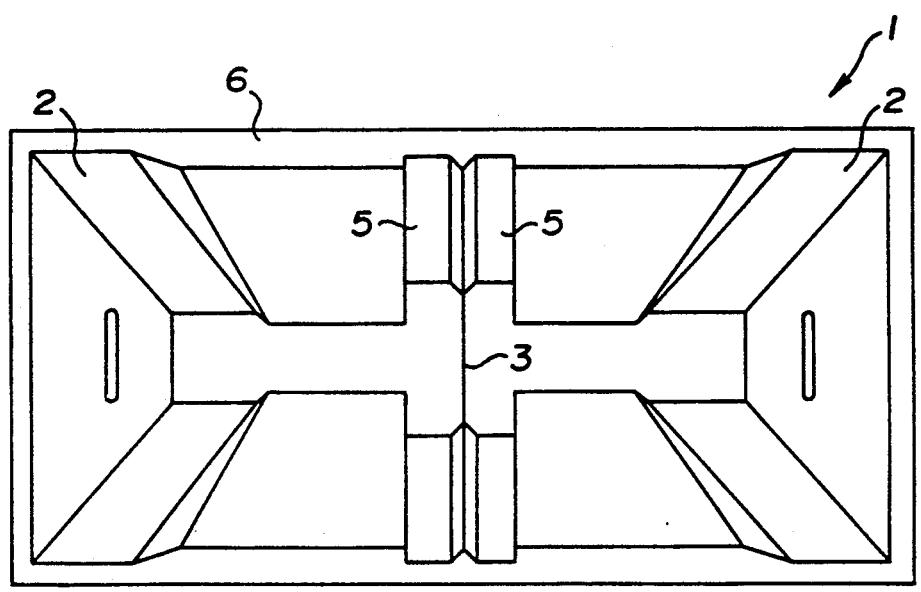
FIG. 2 is a plan view taken from the base of the stand.

Having reference to the accompanying drawings, there is provided a generally pyrimidal pipe support stand 1.

The modular stand 1 is preferably formed of a fluorescent 3/16" thick polyethylene.

The stand 1 defines four angled legs 2 at each of its corners. A groove 3 formed on the upper surface of the stand 1 is adapted to receive the pipe 4. A pair of ribs 5 are formed in the central portion of the stand 1. At the base of the stand 1 there is provided an outwardly extending lip 6, the outer perimeter of which is generally rectangular in shape.

The embodiments of the invention in which an exclusive property or privilege is claimed are defined as follows:

1. A stand for supporting an elongate tubular member which comprises:
  a hollow, generally pyramidal shaped modular body formed of plastic, said body further defining an generally arcuate recess on its upper surface adapted to receive the tubular member therein, said body forming four angled legs at the outer corners thereof and a pair of central ribs on the front and rear sides thereof and said body further having a substantially continuous base forming an outwardly extending rectangular lip.

2. The stand as set forth in claim 1 wherein said central ribs are substantially vertical.

* * * * *